(12) United States Patent
Yang et al.

(10) Patent No.: US 11,968,631 B2
(45) Date of Patent: *Apr. 23, 2024

(54) POWER CONTROL FOR REPEATED UPLINK TRANSMISSIONS

(71) Applicant: QUALCOMM Incorporated, San Diego, CA (US)

(72) Inventors: Wei Yang, San Diego, CA (US); Seyed Ali Akbar Fakoorian, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/183,325

(22) Filed: Mar. 14, 2023

(65) Prior Publication Data
US 2023/0232344 A1 Jul. 20, 2023

Related U.S. Application Data

(63) Continuation of application No. 17/002,590, filed on Aug. 25, 2020, now Pat. No. 11,617,139.
(Continued)

(51) Int. Cl.
*H04W 72/1268* (2023.01)
*H04L 1/08* (2006.01)
(Continued)

(52) U.S. Cl.
CPC .............. *H04W 52/38* (2013.01); *H04L 1/08* (2013.01); *H04L 1/22* (2013.01); *H04L 5/0048* (2013.01);
(Continued)

(58) Field of Classification Search
None
See application file for complete search history.

(56) References Cited

U.S. PATENT DOCUMENTS 10,554,470 B2 2/2020 John Wilson et al.
10,931,484 B2 2/2021 Hosseini et al.
(Continued)

FOREIGN PATENT DOCUMENTS

WO WO-2016070637 A1 5/2016
WO WO-2018218200 A1 11/2018
(Continued)

OTHER PUBLICATIONS

Caict, "Pusch enhancements for URLLC", Aug. 8, 2019, 3GPP TSG RAN WG1 Meeting #98 R1-1909353, pp. 1-8 (Year: 2019).*
(Continued)

*Primary Examiner* — Steve R Young
(74) *Attorney, Agent, or Firm* — Holland & Hart LLP/Qualcomm Incorporated

(57) ABSTRACT

Methods, systems, and devices for wireless communications are described. A user equipment (UE) may be scheduled to send uplink data to a base station using a particular transmission length provided by the base station. The UE may send multiple repetitions of the uplink data to the base station using transmissions that have varying lengths. The UE may determine a transmit power based on the length provided by the base station and use that transmit power for transmitting the repetitions, regardless of the actual lengths of the repetitions.

27 Claims, 9 Drawing Sheets

Related U.S. Application Data

(60) Provisional application No. 62/892,366, filed on Aug. 27, 2019.

(51) Int. Cl.
| | | |
|---|---|---|
| *H04L 1/22* | (2006.01) | |
| *H04L 5/00* | (2006.01) | |
| *H04W 52/14* | (2009.01) | |
| *H04W 52/38* | (2009.01) | |
| *H04W 72/044* | (2023.01) | |
| *H04W 72/23* | (2023.01) | |

(52) U.S. Cl.
CPC ......... *H04L 5/0051* (2013.01); *H04W 52/146* (2013.01); *H04W 72/0473* (2013.01); *H04W 72/1268* (2013.01); *H04W 72/23* (2023.01)

(56) References Cited

U.S. PATENT DOCUMENTS

| | | | |
|---|---|---|---|
| 2015/0208366 A1* | 7/2015 | Papasakellariou | H04W 52/146 370/311 |
| 2016/0330698 A1* | 11/2016 | Loehr | H04W 52/241 |
| 2016/0353440 A1* | 12/2016 | Lee | H04W 74/0833 |
| 2018/0132195 A1* | 5/2018 | Pelletier | H04L 1/1812 |
| 2020/0296673 A1* | 9/2020 | Ouchi | H04W 52/325 |
| 2020/0351798 A1* | 11/2020 | Ji | H04W 52/10 |
| 2021/0051707 A1* | 2/2021 | Rastegardoost | H04L 5/0051 |
| 2021/0068062 A1 | 3/2021 | Yang et al. | |
| 2022/0201722 A1* | 6/2022 | Takeda | H04L 1/08 |

FOREIGN PATENT DOCUMENTS

| | | |
|---|---|---|
| WO | WO-2019126063 A1 | 6/2019 |
| WO | WO-2019151789 A1 | 8/2019 |

OTHER PUBLICATIONS

CAICT: "PUSCH Enhancements for URLLC", 3GPP TSG RAN WG1 Meeting#98, 3GPP Draft; R1-1909352, 3rd Generation Partnership Project (3GPP), Mobile Competence Centre, 650, Route Des Lucioles, F-06921 Sophia-Antipolis Cedex, France , vol. RAN WG1, No. Prague, Czech; Aug. 26, 2019-Aug. 30, 2019, Aug. 16, 2019 (Aug. 16, 2019), 8 Pages, XP051765959, section 1, section 2, sub-section PUSCH transmit, power, figure 1, section 2, RV Determination.

International Preliminary Report on Patentability—PCT/US2020/047912 The International Bureau of WIPO—Geneva, Switzerland, dated Mar. 10, 2022.

International Search Report and Written Opinion—PCT/US2020/047912—ISA/EPO—dated Feb. 11, 2021.

Qualcomm Incorporated: "PUSCH Enhancements for eURLLC", 3GPP Draft, 3GPP TSG-RAN WG1 #98, R1-1909266, PUSCH Enhancements for eURLLC, 3rd Generation Partnership Project (3GPP), Mobile Competence Centre, 650, Route Des Lucioles, F-06921, Sophia-Antipolis Cedex, France, vol. Ran WG1, No. Prague, Czech Republic; Aug. 26, 2019-Aug. 30, 2019, Aug. 17, 2019 (Aug. 17, 2019), XP051765871, 5 Pages, the whole document, p. 3, line 8—line 18; figure 1.

Taiwan Search Report—TW109129320—TIPO—dated Nov. 11, 2023.

\* cited by examiner

POWER CONTROL FOR REPEATED UPLINK TRANSMISSIONS

CROSS REFERENCE

The present Application for Patent is a continuation of U.S. patent application Ser. No. 17/002,590 by YANG et al., entitled "POWER CONTROL FOR REPEATED UPLINK TRANSMISSIONS," filed Aug. 25, 2020, which claims the benefit of U.S. Provisional Patent Application No. 62/892,366 by YANG et al., entitled "POWER CONTROL FOR REPEATED UPLINK TRANSMISSIONS," filed Aug. 27, 2019, each of which is assigned to the assignee hereof, and each of which is expressly incorporated by reference herein.

FIELD OF TECHNOLOGY

The following relates generally to wireless communications and more specifically to power control for repeated uplink transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE). Communications from a base station to a UE may be referred to as downlink communications and communications from a UE to a base station may be referred to as uplink communications.

In some examples, a UE may transmit the same uplink data multiple times. In some instances the multiple transmissions may be scheduled as repetitions and may increase reliability. In other instances, the multiple transmissions may arise due to a scheduled transmission being broken into more than one actual transmission. Each of the multiple transmissions will have an associated transmit power. But in certain situations, the transmit power used for the transmissions may make it difficult for a base station to receive the repetitions.

SUMMARY

The described techniques relate to improved methods, systems, devices, and apparatuses that support power control for repeated uplink transmissions. Generally, the described techniques provide for a user equipment (UE) to use the same transmit power for repetitions of uplink data. The UE may be scheduled to send uplink data to a base station using a particular transmission length provided by the base station. The UE may send multiple repetitions of the uplink data to the base station using transmissions that have varying lengths. The UE may determine a transmit power based on the length provided by the base station and use that transmit power for transmitting the repetitions, regardless of the actual lengths of the repetitions.

A method of wireless communication is described. The method may include receiving an uplink grant that schedules a transmission of uplink data using a first number of symbols; identifying, based at least in part on the uplink grant, an uplink transmission opportunity during which the uplink data is to be transmitted, wherein the uplink transmission opportunity includes a second number of symbols different from the first number of symbols; determining a transmission power for the uplink transmission opportunity based at least in part on the first number of symbols; and transmitting the uplink data during the uplink transmission opportunity using the transmission power.

An apparatus for wireless communication is described. The apparatus may include a processor, memory coupled with the processor, and instructions stored in the memory. The instructions may be executable by the processor to cause the apparatus to receive an uplink grant that schedules a transmission of uplink data using a first number of symbols; identify, based at least in part on the uplink grant, an uplink transmission opportunity during which the uplink data is to be transmitted, wherein the uplink transmission opportunity includes a second number of symbols different from the first number of symbols; determine a transmission power for the uplink transmission opportunity based at least in part on the first number of symbols; and transmit the uplink data during the uplink transmission opportunity using the transmission power.

Another apparatus for wireless communication is described. The apparatus may include means for receiving an uplink grant that schedules a transmission of uplink data using a first number of symbols; identifying, based at least in part on the uplink grant, an uplink transmission opportunity during which the uplink data is to be transmitted, wherein the uplink transmission opportunity includes a second number of symbols different from the first number of symbols; determining a transmission power for the uplink transmission opportunity based at least in part on the first number of symbols; and transmitting the uplink data during the uplink transmission opportunity using the transmission power.

A non-transitory computer-readable medium storing code for wireless communication is described. The code may include instructions executable by a processor to receive an uplink grant that schedules a transmission of uplink data using a first number of symbols; identify, based at least in part on the uplink grant, an uplink transmission opportunity during which the uplink data is to be transmitted, wherein the uplink transmission opportunity includes a second number of symbols different from the first number of symbols; determine a transmission power for the uplink transmission opportunity based at least in part on the first number of symbols; and transmit the uplink data during the uplink transmission opportunity using the transmission power.

In some examples of the method, apparatuses, and non-transitory computer-readable medium described herein, the uplink grant schedules a physical uplink shared channel (PUSCH) with a repetition type that permits a nominal transmission of the PUSCH to include one or more actual transmissions of the PUSCH.

In some examples of the method, apparatuses, and non-transitory computer-readable medium described herein, the first number of symbols is indicated by a starting and length indicator (SLIV) included in the uplink grant.

In some examples of the method, apparatuses, and non-transitory computer-readable medium described herein, determining the transmission power may include operations, features, means, or instructions for calculating the transmission power based on the first number of symbols.

Some examples of the method, apparatuses, and non-transitory computer-readable medium described herein may further include operations, features, means, or instructions for determining a reference signal configuration based at least in part on the first number of symbols. In some examples of the method, apparatuses, and non-transitory computer-readable medium described herein, determining the transmission power may include operations, features, means, or instructions for calculating the transmission power based at least in part on the reference signal configuration.

Some examples of the method, apparatuses, and non-transitory computer-readable medium described herein may further include operations, features, means, or instructions for determining, based at least in part on the reference signal configuration, a number of resource elements for a demodulation reference signal and a phase-tracking reference signal, wherein the transmission power is calculated based at least in part on the number of resource elements.

Some examples of the method, apparatuses, and non-transitory computer-readable medium described herein may further include operations, features, means, or instructions for determining a number of resource elements for transmitting the uplink data based at least in part on the first number of symbols. In some examples of the method, apparatuses, and non-transitory computer-readable medium described herein, determining the transmission power may include operations, features, means, or instructions for calculating the transmission power based on the number of resource elements for transmitting the uplink data.

In some examples of the method, apparatuses, and non-transitory computer-readable medium described herein, determining the transmission power may include operations, features, means, or instructions for calculating the transmission power based on a bit per resource element (BPRE) associated with the transmission of uplink data, where the BPRE may be a function of a number of resource elements scheduled for the transmission of uplink data.

In some examples of the method, apparatuses, and non-transitory computer-readable medium described herein, the number of resource elements scheduled for the transmission of uplink data may be different from a number of resource elements actually used for the transmission of uplink data.

In some examples of the method, apparatuses, and non-transitory computer-readable medium described herein, the second number of symbols is less than the first number of symbols, and the uplink transmission opportunity is for a portion of a scheduled repetition of the uplink data.

Some examples of the method, apparatuses, and non-transitory computer-readable medium described herein may further include operations, features, means, or instructions for determining that the uplink data is scheduled across a slot boundary; identifying, as a result of the uplink data being scheduled across the slot boundary, that the uplink transmission opportunity occurs before the slot boundary or after the slot boundary; and transmitting a demodulation reference signal (DMRS) during the uplink transmission opportunity based at least in part on determining that the uplink transmission opportunity occurs before or after the slot boundary.

Some examples of the method, apparatuses, and non-transitory computer-readable medium described herein may further include operations, features, means, or instructions for determining that resources for transmitting the uplink data coincide with a downlink data transmission including a third number of symbols, where the second number of symbols includes the first number of symbols minus the third number of symbols.

In some examples of the method, apparatuses, and non-transitory computer-readable medium described herein, the uplink grant includes a repetition factor that indicates the uplink data may be to be transmitted multiple times, and where the uplink transmission opportunity is determined based on the repetition factor.

In some examples of the method, apparatuses, and non-transitory computer-readable medium described herein, the first number of symbols is a number of symbols in a nominal transmission of a PUSCH and the second number of symbols is a number of symbols in an actual transmission of the PUSCH.

In some examples of the method, apparatuses, and non-transitory computer-readable medium described herein, the uplink grant may be included in a downlink control information (DCI) message or a radio resource control (RRC) message.

DETAILED DESCRIPTION

In some cases, a user equipment (UE) in a wireless communications system may transmit the same data to a base station multiple times to increase reliability (e.g., to ensure the base station receives the information). For example, a UE may employ physical uplink shared channel (PUSCH) repetition, where the UE repeats transmission of the same data over the PUSCH several times. The repetitions may be scheduled or result from a UE breaking a scheduled transmission into multiple transmissions. Regardless of how repetitions arise, the UE may determine the transmit power for each PUSCH transmission based on the actual length (e.g., number of symbols) of that particular PUSCH transmission. This means that when the lengths of repeated PUSCH transmissions vary, the UE uses different transmit powers for the PUSCH transmissions. But discrepancies in transmit powers may introduce a phase change between PUSCH transmissions, which may adversely affect the ability of the base station to receive and combine the transmissions.

According to the techniques described herein, a UE may prevent phase change between PUSCH transmissions of different lengths by using the same transmit power for the PUSCH transmissions, even if the lengths of the PUSCH transmissions vary. In one implementation, the UE may receive an uplink grant that schedules PUSCH repetitions of a first length (e.g., x symbols). The UE may then determine the actual lengths of the PUSCH transmissions, which may differ from each other and the scheduled length (e.g., due to conditions of the communication environment, such as the location of slot boundaries). The UE may calculate the same transmit power for all of the repeated PUSCH transmissions using the scheduled length, as opposed to computing the transmit power for each PUSCH transmission using its actual length. Thus, the UE may use the same transmit for each PUSCH transmission in a repetition set, regardless of the length of that PUSCH transmission.

Aspects of the disclosure are initially described in the context of one or more wireless communications systems. Aspects of the disclosure are also described in the context of systems and process flows that show the operations of one or more devices in one or more wireless communications systems. Aspects of the disclosure are further illustrated by and described with reference to apparatus diagrams, system diagrams, and flowcharts that relate to power control for uplink transmissions, such as PUSCH transmissions.

Figure 1:
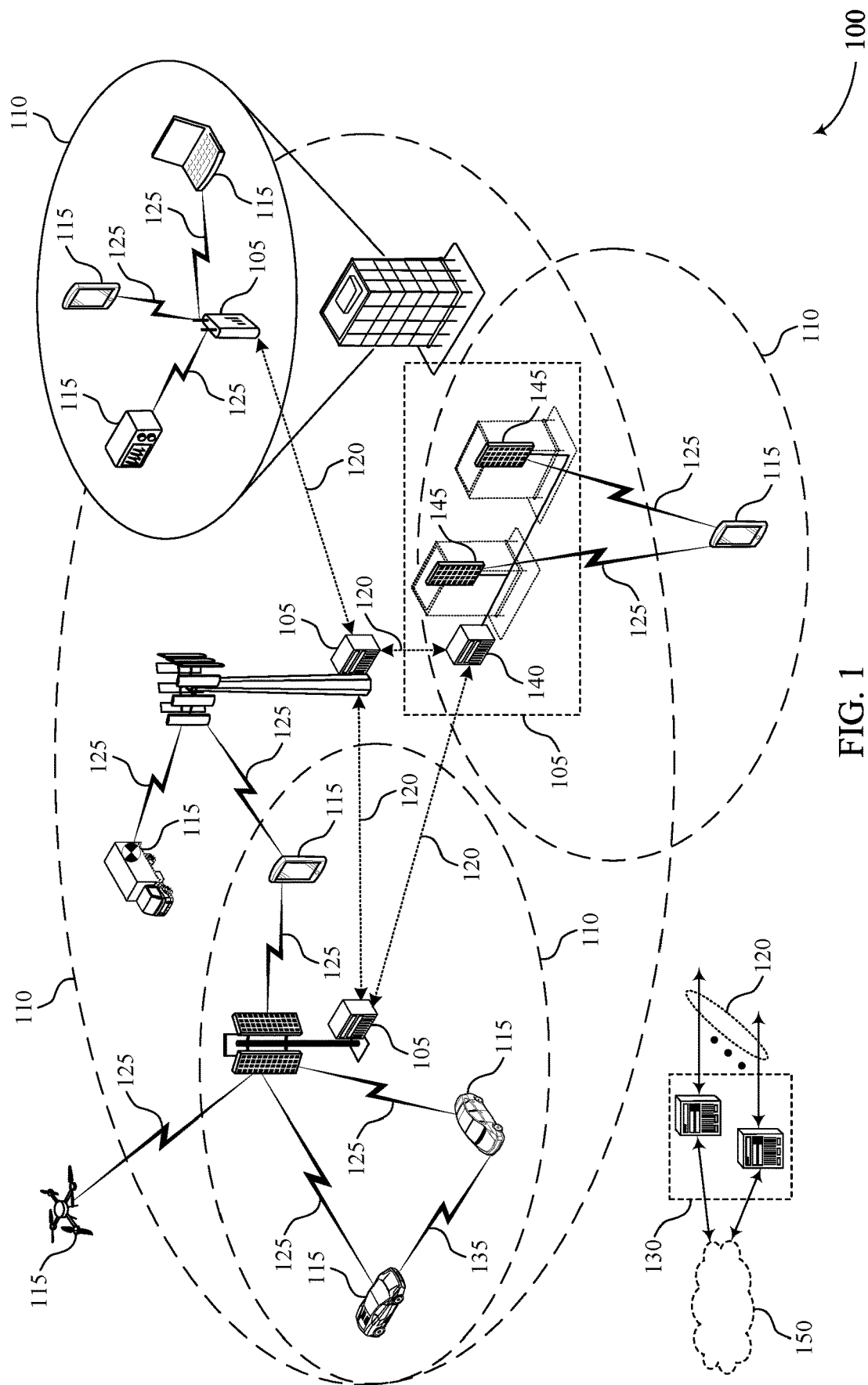
FIG. 1 illustrates an example of a system for wireless communications that supports power control for repeated uplink transmissions in accordance with aspects of the present disclosure.

FIG. 1 illustrates an example of a wireless communications system 100 that supports power control for repeated uplink transmissions in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 and/or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into BWPs having the same or different numerologies. In some examples, a UE 115 may be configured with multiple BWPs. In some cases, a single BWP for a carrier is active at a given time, and communications for the UE 115 may be restricted to active BWPs.

Time intervals for base stations 105 or UEs 115 may be expressed in multiples of a basic time unit which may, for example, refer to a sampling period of $TS=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

In some implementations, a UE 115 may use a repetition scheme in which the UE 115 sends the same data to a base station 105 multiple times. The repetition scheme may increase communication reliability by allowing the base station 105 to receive and combine multiple transmissions of the data (e.g., the base station 105 may perform join channel estimation across the multiple transmissions). In some examples, the repetition scheme may be a PUSCH repetition scheme where the UE 115 repeatedly transmits the same uplink data over PUSCH. PUSCH repetitions may be scheduled by a base station 105 or result from a single scheduled PUSCH transmission being split into multiple PUSCH transmissions. In some cases, PUSCH repetitions may be scheduled on a mini-slot basis, as opposed to a slot-basis.

To initiate PUSCH repetitions, a base station 105 may send to the UE 115 an uplink grant that schedules the PUSCH repetitions and indicates repetition parameters. For example, the uplink grant may include a repetition factor, K, which indicates the number of times the UE 115 is to transmit the same data over the PUSCH. The uplink grant may also include a starting and length indicator (SLIV), which may indicate when the PUSCH repetitions should start and the length of each PUSCH transmission. The uplink grant may be received in downlink control information (DCI) or via radio resource control (RRC) signaling. In some examples, an uplink grant conveyed via DCI may be referred to as a dynamic grant and an uplink grant conveyed via RRC signaling may be referred to as a configured grant.

Upon receiving the uplink grant, a UE 115 may determine a transmission opportunity for each scheduled PUSCH transmission. The UE 115 may also determine the length of each PUSCH transmission (e.g., based on the respective transmission opportunity) and a transmit power for each PUSCH transmission. In certain systems, the UE 115 may determine the transmit power for a PUSCH transmission based on its length. The "length" or "actual length" of a PUSCH transmission may refer to the number of symbols over which PUSCH data is transmitted. But using the actual length of PUSCH transmissions to determine transmit power may negatively impact the ability of the base station 105 to receive the PUSCH transmissions. For example, when PUSCH transmissions vary in length, the resulting difference in transmit powers may introduce a phase change between PUSCH transmissions, which may make it more difficult for a base station 105 to receive them.

To solve this problem, a UE 115 may use the same transmit power for PUSCH transmissions of the same data, regardless of the actual length of the PUSCH transmissions. To do so, the UE 115 may determine the transmission power for the PUSCH transmissions based on the PUSCH length provided by the uplink grant, rather than the actual length of the PUSCH transmissions. Although described with reference to PUSCH repetition, the techniques described herein can be implemented in any type of repetition scheme. Unless context provides otherwise, the terms transmission and repetition may be used interchangeably herein.

Figure 2:
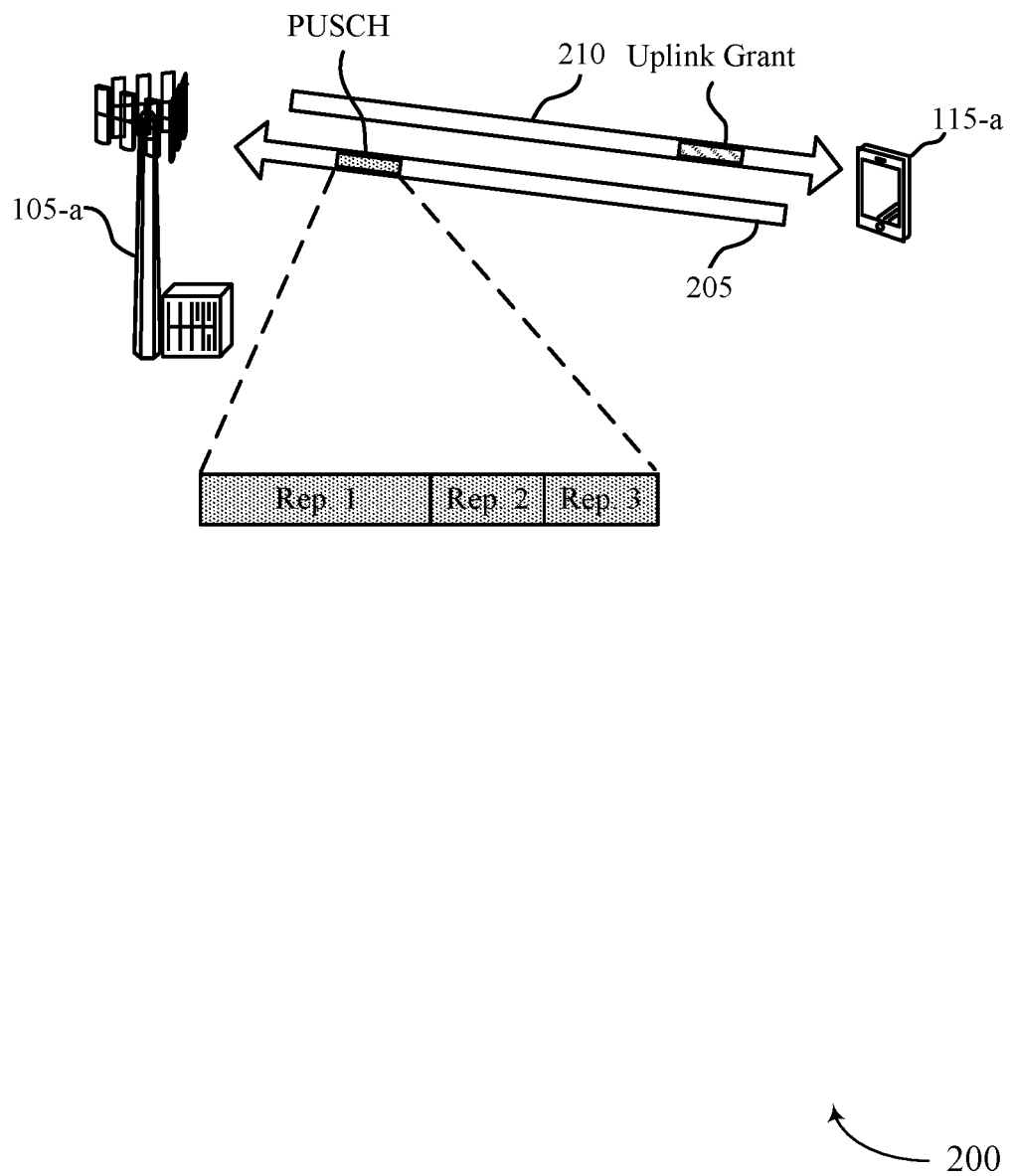
FIG. 2 illustrates an example of a wireless communications system that supports power control for repeated uplink transmissions in accordance with aspects of the present disclosure.

FIG. 2 illustrates an example of a wireless communications system 200 that supports power control for repeated uplink transmissions in accordance with aspects of the present disclosure. In some examples, wireless communications system 200 may implement aspects of wireless communications system 100. In the illustrated example, wireless communications system 200 may include UE 115-a and base station 105-*a*. UE 115-*a* may be an example of a UE 115 from FIG. 1 and base station 105-*a* may be an example of a base station 105 from FIG. 1.

Base station 105-*a* and UE 115-*a* may communicate with each other via uplink 205 and downlink 210. For instance, UE 115-*a* may send uplink data and control information to base station 105-*a* using various channels of uplink 205, and base station 105-*a* may send downlink data and control information to UE 115-*a* using various channels of downlink 210. Base station 105-*a* may schedule uplink transmissions by UE 115-*a* by sending UE 115-*a* an uplink grant. In one example, an uplink grant may be part of downlink control information conveyed by a physical downlink control channel (PDCCH). In another example, the uplink grant may be included in an RRC message. In some examples, the uplink grant may schedule one or more PUSCH transmissions by UE 115-*a*. For example, the uplink grant may schedule two PUSCH transmissions (K=2) each of length x (L=x symbols). If two or more PUSCH transmissions are for the same uplink data, the transmissions may be referred to as PUSCH repetitions.

Upon receiving the PUSCH scheduling information in the uplink grant, UE 115-*a* may identify a transmission opportunity for each repetition of the PUSCH. But due to system constraints, the length of a transmission opportunity may be less than the scheduled length x. This may occur, for example, when a PUSCH transmission is scheduled across a slot boundary and UE 115-*a* splits the PUSCH transmission into two transmissions. In such a scenario, UE 115-*a* may transmit three PUSCH repetitions (e.g., repetition 1, repetition 2, and repetition 3), even though only two repetitions were scheduled, and the lengths of the repetitions may vary (e.g., the lengths of repetition 2 and repetition 3 may be less than the length of repetition 1). Thus, when the length of a transmission opportunity decreases, the length of an associated PUSCH repetition may also decrease. However, the UE may compensate for the reduced length by increasing the amount of information carried by a resource (e.g., the UE may increase the bits per resource element (BPRE) for a shortened PUSCH transmission). A transmission opportunity may also be referred to herein as a transmission occasion.

Before transmitting the PUSCH repetitions, UE 115-*a* may calculate the transmit power for each repetition. For example, UE 115-*a* may calculate the transmit power of a PUSCH transmission, $P_{PUSCH}$, using the formula $P_{PUSCH} = \min\{P_{C,max}, P_0(j) + \alpha(j) \cdot PL(q) + 10 \log_{10}(2^\mu M_{RB}) + \Delta_{TF} + f(l)\}$, where $P_{C,max}$ is the maximum transmit power of UE 115-*a*, $P_0(j)$ and $\alpha(j)$ are open loop power control parameters, PL(q) is the path-loss measured by downlink reference signals, q is the path-loss index, $M_{RB}$ is the number of resource blocks (RBs) of the PUSCH transmission, $\Delta_{TF}$ is the delta power based on the spectral efficiency of the PUSCH, and f(l) is the closed-loop power control.

In some examples, the delta factor, $\Delta_{TF}$, may be calculated using the formula $\Delta_{TF} = 10 \log_{10}[(2^{BPRE \cdot K_S} - 1)\beta_{offset}^{PUSCH}]$ for $K_S = 1.25$. When the PUSCH is scheduled with uplink shared data, f e may be equal to one and the BPRE may be calculated using the formula $$BPRE = \sum_{r=0}^{C} K_r / N_{RE},$$

where C is the number of code blocks (CBs) in the PUSCH, $K_r$ is the payload size of each code block, and $N_{RE}$ is the number of resource elements (REs) allocated for the PUSCH. When the PUSCH is not scheduled with uplink shared data, BPRE may be calculated using the formula $BPRE = Q_m \cdot R / \beta_{offset}^{PUSCH}$, where $Q_m$ is the modulation order and R is the coding rate.

The number of resource elements allocated for the PUSCH transmission, $N_{RE}$, may be calculated using the formula $$N_{RE} = M_{RB,b,f,c}^{PUSCH}(i) \cdot \sum_{j=0}^{N_{symb\ b,f,c}^{PUSCH}(i)-1} N_{sc,data}^{RB}(i, j),$$

where $N_{symb\ b,f,c}^{PUSCH}(i)$ is the number of symbols for the PUSCH transmission occasion i on an active uplink bandwidth part b of carrier f of serving cell c. The variable $N_{sc,data}^{RB}(i, j)$ may be the number of subcarriers excluding demodulation reference signal (DM-RS) subcarriers and phase-tracking reference signal (RS) samples in a PUSCH symbol j.

In summary, the transmit power $P_{PUSCH}$ may be a function of the delta factor $\Delta_{TF}$, which may be a function of BPRE, which may be a function of $N_{RE}$ (e.g., when data is scheduled), which in turn may be a function of $N_{symb\ b,f,c}^{PUSCH}(i)$. Thus, the transmit power $P_{PUSCH}$ may vary with the number of symbols making up the associated PUSCH transmission occasion. This means that when the length of PUSCH transmission occasions vary, the power used to transmit PUSCH data during the occasions also varies. For example, the transmit power used for PUSCH repetition 1 may be different than the transmit power used for PUSCH repetition 2 or PUSCH repetition 3. Thus, the transmit power used for the repetitions may vary with their length. But such variance may introduce a phase difference between the PUSCH repetitions that inhibits reception at base station 105-*a*.

According to the techniques described herein, UE 115-*a* may prevent phase differences between PUSCH repetitions by using the same transmit power for each repetition, regardless of the length of the associated transmission opportunity. For example, UE 115-*a* may use the same transmit power for PUSCH repetitions (e.g., repetition 1, repetition 2, and repetition 3), even though the lengths of the repetitions vary. UE 115-*a* may calculate the transmit power using the length of the PUSCH transmission provided by the uplink grant, rather than the length of an actual PUSCH transmission or transmission opportunity. For instance, rather than calculating $N_{RE}$ using $N_{symb\ b,f,c}^{PUSCH}(i)$, UE 115-*a* may calculate $N_{RE}$ using the number of symbols for the PUSCH transmission provided by the uplink grant.

Figure 3:
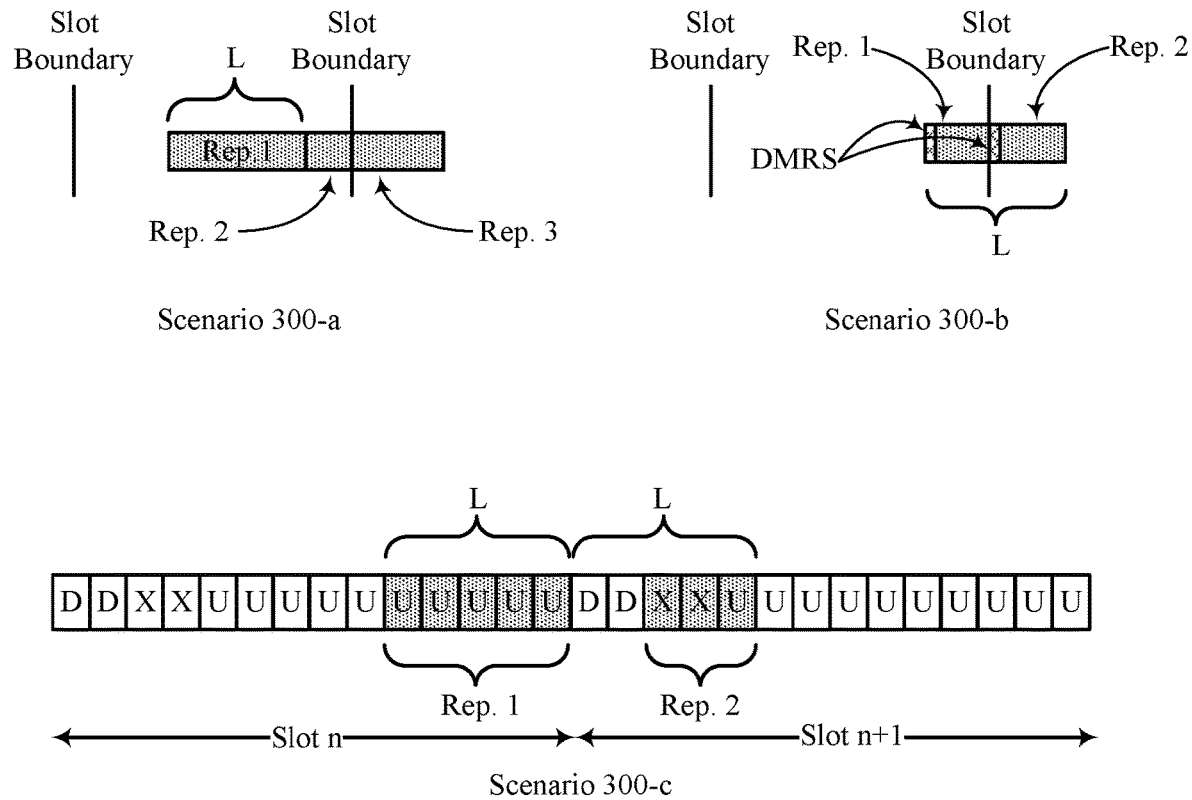
FIG. 3 illustrates an example of communication scenarios that support power control for repeated uplink transmissions in accordance with aspects of the present disclosure.

FIG. 3 illustrates an example of communication scenarios 300 that support power control for repeated uplink transmissions in accordance with aspects of the present disclosure. In some examples, communication scenarios 300 may implement aspects of wireless communications system 100. For example, communication scenarios 300 may be examples of communication scenarios that occur when a base station 105 schedules a UE 115 to transmit data over the PUSCH (e.g., on a mini-slot basis). Communication scenarios 300-*a*, 300-*b*, and 300-*c* may illustrate PUSCH repetitions with various lengths due to, for example, splitting or shortening.

In communication scenario 300-*a*, a UE may be scheduled by a base station to send multiple (e.g., two) PUSCH repetitions of length L to the base station. But after receiving the scheduling information, the UE may determine that the second PUSCH repetition crosses a slot boundary. Because a base station may expect certain signals (e.g., reference signals) at the beginning of a slot, transmitting a repetition across a slot boundary may hinder reception at the base station. Accordingly, the UE may convert (e.g., split) the PUSCH repetition into two repetitions so that one repetition (e.g., repetition 2) occurs before the slot boundary and the other repetition (e.g., repetition 3) occurs after the slot boundary. Thus, in communication scenario 300-a, the UE may send three repetitions of PUSCH data instead of two, and the repetitions may have varying lengths. For example, repetition 1 may have an actual length equal to L, whereas repetition 2 and repetition 3 may have actual lengths less than L. In some examples a repetition that has an actual length less than L may be referred to as an actual repetition and a set of actual repetitions that have a collective length L may be referred to as a nominal repetition. Thus, a nominal repetition may include one or more actual repetitions.

Rather than determine the transmit power for each repetition based on its actual length, which may lead to reception complications at the base station, the UE may determine the transmit power for each repetition based on the length of a nominal repetition. A nominal repetition may be a repetition whose length (e.g., number of symbols) is equal to the length L provided by the base station (e.g., indicated in the SLIV). Thus, in the given example, the UE may calculate the transmit power using the length of the nominal repetition (e.g., repetition 1) and use that transmit power for each repetition regardless of its actual length. For instance, the UE may transmit repetition 1, repetition 2, and repetition 3 with the same transmit power, even though repetition 2 and repetition 3 have lengths different from the scheduled length.

In communication scenario 300-b, a UE may be scheduled by a base station to send one PUSCH transmission of length L to the base station. For example, the UE may be scheduled to send a PUSCH transmission that has a length of seven symbols. Thus, the UE may determine that is it to send a PUSCH repetition using seven data symbols that are preceded by a demodulation reference signal (DMRS) symbol. However, the UE may determine that the scheduled PUSCH transmission crosses a slot boundary. Accordingly, the UE may convert the PUSCH transmission into two PUSCH transmissions, repetition 1 and repetition 2, each of which starts with a DMRS and each of which includes three symbols for PUSCH data. Thus, rather than sending a nominal repetition of seven symbols, the UE may send two repetitions of three symbols.

Although there is no nominal repetition for the UE to reference, the UE may calculate the transmit power for the repetitions using the length of a virtual nominal repetition. A virtual nominal repetition may refer to a repetition scheduled by the base station but not sent by the UE. Thus, the UE may determine the transmit power for the repetitions based on the length L provided by the base station even though the UE does not transmit any repetitions of that length. The UE may also determine the transmit power based on a reference signal configuration associated with the length L. A reference signal configuration may refer to a number of resources (symbols or resource elements) in the PUSCH allocated for reference signals, such as DMRS and phase-tracking reference signals (PTRS). Each scheduled length L may have an associated reference signal configuration. For example, a scheduled length L=8 may indicate that a PUSCH transmission should include one reference signal and seven data symbols.

According to the techniques described herein, a UE may calculate the transmit power for a PUSCH repetition based on the PUSCH resources allocated for data by the uplink grant, rather than the PUSCH resources actually used to convey data. Thus, in communication scenario 300-b, the UE may determine the transmit power using a length of seven symbols (the number of symbols scheduled for data) rather than using a length of three symbols (the number of symbols actually used for data). Thus, the UE may determine the transmit power based on length L and the reference signal configuration associated with L. Although described with reference to communication scenario 300-b, a UE may use the reference signal configuration in other communication scenarios, such as communication scenarios 300-a and 300-c.

In communication scenario 300-c, a UE may be operating in a TDD system that includes uplink symbols, denoted U, and downlink symbols, denoted D. The TDD system may also include special symbols, denoted, X, for switching between downlink and uplink. In communication scenario 300-c, the UE may be scheduled by a base station to send two PUSCH repetitions of length L to the base station. For example, the UE may be scheduled to send two PUSCH repetitions that each have a length of five symbols. The first PUSCH repetition may be scheduled during slot n, and the second PUSCH repetition may be scheduled during slot n+1. But the UE may determine that one of the scheduled PUSCH transmissions coincides with a downlink transmission. For example, the UE may determine that a portion of the second repetition, repetition 2, is scheduled during one or more symbols allocated for downlink data. Accordingly, the UE may shorten the length of the second repetition (e.g., to a number of symbols equal to L minus the number of downlink symbols). However, according to the techniques described herein, the transmit power used for both repetition 1 and repetition 2 may be calculated using the length L of the nominal repetition (e.g., repetition 1).

Thus, a UE may, in various scenarios, determine the transmit power of a PUSCH repetition based on the length L of a nominal repetition, regardless of the length of the actual transmission for the PUSCH repetition. It should be appreciated that a UE may support different types of PUSCH repetitions. For example, a UE may support Type A PUSCH repetitions, which include nominal transmissions of length L that include a single actual transmission, and Type B PUSCH repetitions, which include nominal transmissions that include one or more actual transmissions that may or may not have length L (e.g., an actual transmission may have a length less than L). Thus, Type B PUSCH (or "PUSCH repetition Type B") may be a type of PUSCH repetition that permits a nominal transmission of the PUSCH to include one or more actual transmissions of the PUSCH. Accordingly, the PUSCH repetitions shown in FIG. 3, and described herein, may be examples of Type B PUSCH transmissions.

Figure 4:
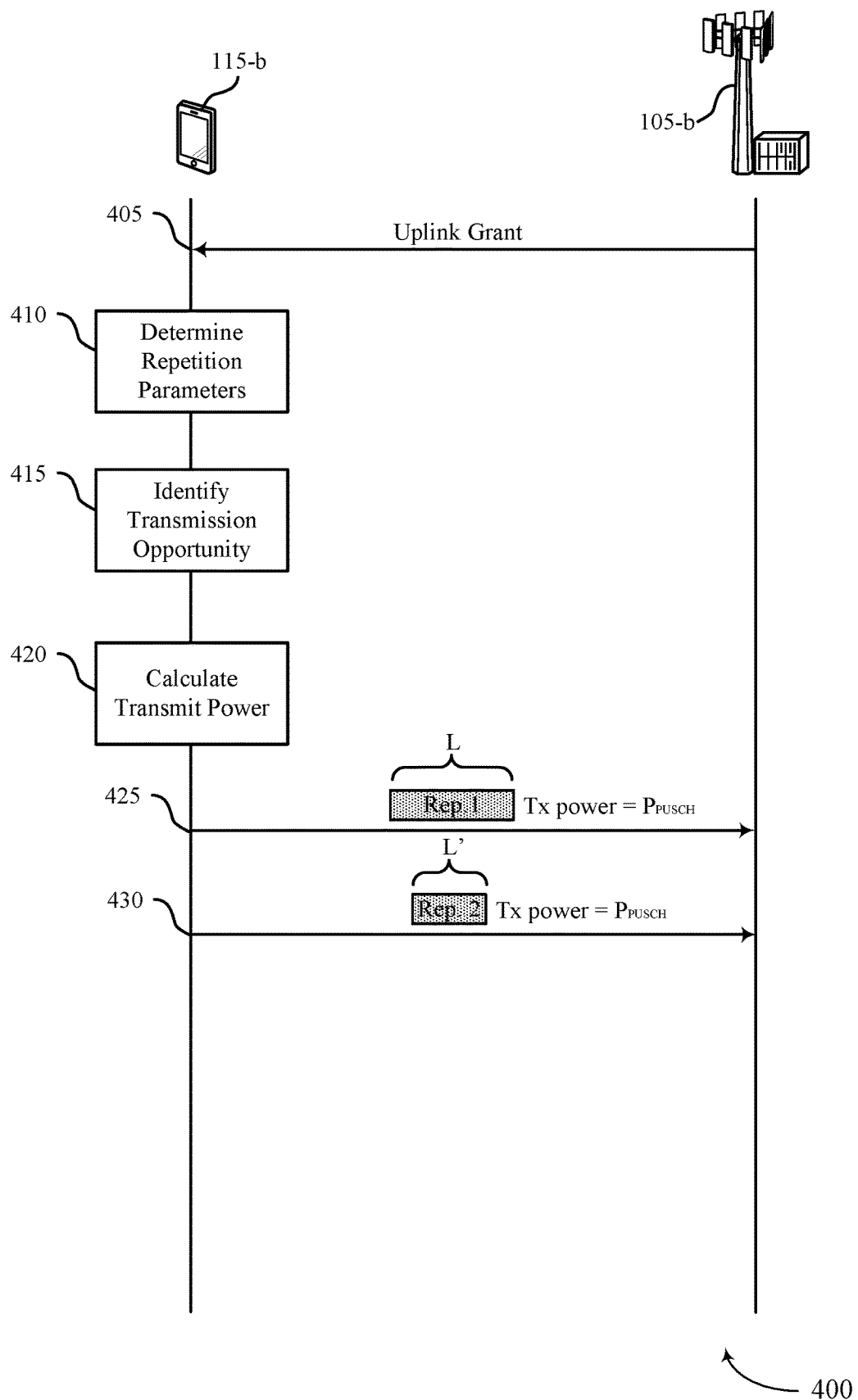
FIG. 4 illustrates an example of a process flow that supports power control for repeated uplink transmissions in accordance with aspects of the present disclosure.

FIG. 4 illustrates an example of a process flow 400 that supports power control for repeated uplink transmissions in accordance with aspects of the present disclosure. In some examples, process flow 400 may implement aspects of wireless communications system 100. For example, process flow 400 may include UE 115-b and base station 105-b. In the following description of the process flow 400, the operations between base station 105-b and UE 115-b may occur in a different order than the exemplary order shown, or the operations performed by the devices may be performed in different orders or at different times. Certain operations may also be left out of the process flow 400, or other operations may be added to the process flow 400.

At 405, UE 115-b may receive from base station 105-b an uplink grant that schedules a transmission of uplink data (e.g., a PUSCH transmission) during a first number of symbols (e.g., OFDM symbols). The uplink grant may be included in downlink control information or RRC signaling. The uplink grant may include SLIV information, such as repetition factor K and length L. Thus, the first number of symbols may be equal to the length L. In some cases, the uplink grant may also indicate a number of resource elements for a transmission of the uplink data.

At 410, UE 115-b may determine parameters for the repetition(s) based on the uplink grant. For example, UE 115-b may determine the number of times UE 115-b is to transmit the uplink data (e.g., the number of repetitions, K), the length of each repetition (e.g., L), and when to start the first repetition (e.g., S), among other parameters. In some cases, a single repetition (e.g., one transmission) of the uplink data may be scheduled. In other cases, multiple repetitions (e.g., multiple transmissions) of the uplink data may be scheduled.

At 415, UE 115-b may, based on the uplink grant, identify one or more transmission opportunities for the scheduled repetition(s). For example, UE 115-d may identify a first uplink transmission opportunity for a first repetition of the uplink data and a second uplink transmission opportunity for a second repetition of the uplink data. An uplink transmission opportunity may be a set of symbols selected by UE 115-d for transmission of the uplink data. In some cases, the first and second uplink transmission opportunities may include a number of symbols different from L.

If a repetition is scheduled across a slot boundary, the first transmission opportunity may occur before the slot boundary and the second transmission opportunity may occur after the slot boundary. Thus, UE 115-d may convert a single repetition into multiple repetitions with lengths different from L (e.g., as described in communication scenarios 300-a and 300-b). If a scheduled repetition conflicts with a downlink data transmission, the length of that repetition may be shortened based on the length of the downlink data transmission (e.g., as described in communication scenario 300-c). For example, the length of the uplink transmission opportunity may be changed so that it is equal to the first number of symbols minus the number of symbols used for the downlink data transmission. Thus, UE 115-b may identify uplink transmission opportunities and modify repetition parameters (e.g., K and/or L) based on the relationship(s) between scheduled uplink data transmissions, slot boundaries, and downlink data transmissions.

At 420, UE 115-b may calculate the transmit power for the PUSCH repetitions. The transmit power, $P_{PUSCH}$, may be calculated using the length L provided by the uplink grant. Thus, the transmit power may be calculated using the first number of symbols, which is the number of symbols for the PUSCH transmission opportunity indicated by the uplink grant. Because the number of resource elements scheduled for transmission of a repetition is a function of the length L, the power calculation may also be said to be based on the number of resource elements. Similarly, because the BPRE associated with a repetition is a function of the number of resource elements, the power calculation may also be said to be based on the BPRE. In some cases, UE 115-b may calculate the transmit power based on the first number of symbols (e.g., based on length L) and a reference signal configuration associated with the first number of symbols. For example, to calculate BPRE and/or the number of resource elements, UE 115-b may use a number of symbols equal to the first number of symbols minus the number of symbols scheduled for reference signals.

At 425, UE 115-b may use the transmit power, $P_{PUSCH}$, to transmit a first repetition of the uplink data during the first uplink transmission opportunity. The first uplink transmission opportunity (and thus the first repetition) may have a length equal to L. At 430, UE 115-b may use the transmit power, $P_{PUSCH}$, to transmit a second repetition of the uplink data during the second transmission opportunity. The second uplink transmission opportunity, and thus the second repetition, may have a length equal to L', where L is different from L'. Thus, two PUSCH repetitions with different lengths may be transmitted with the same transmit power. Put another way, a PUSCH repetition with a first length may be transmitted with a power that is calculated based on a second length (e.g., the length indicated by the uplink grant).

Figure 5:
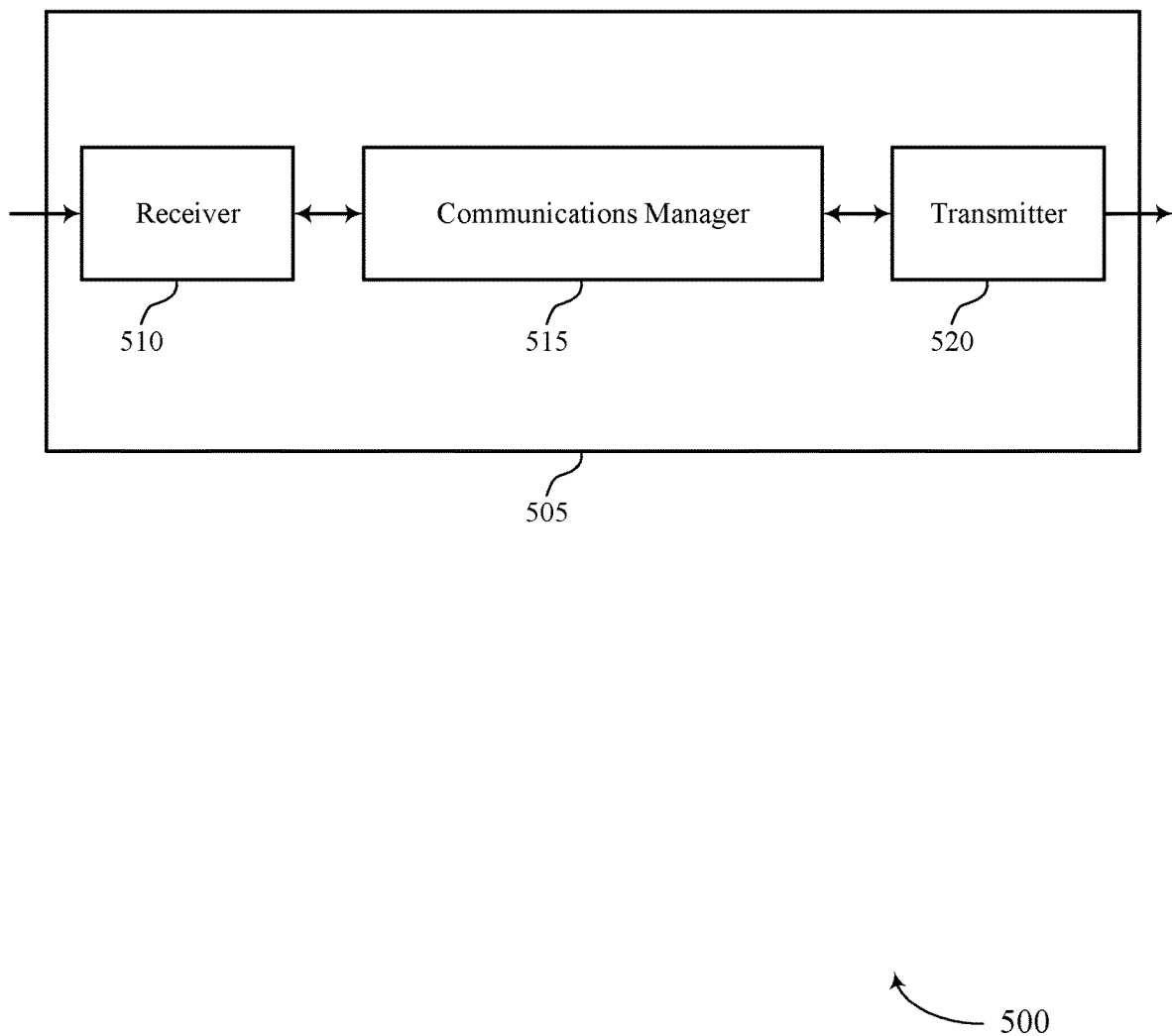
FIGS. 5 and 6 show block diagrams of devices that support power control for repeated uplink transmissions in accordance with aspects of the present disclosure.

FIG. 5 shows a block diagram 500 of a device 505 that supports power control for repeated uplink transmissions in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to power control for repeated uplink transmissions, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive an uplink grant that schedules a transmission of uplink data using a first number of symbols; identify, based at least in part on the uplink grant, an uplink transmission opportunity during which the uplink data is to be transmitted, where the uplink transmission opportunity includes a second number of symbols different from the first number of symbols; determine a transmission power for the uplink transmission opportunity based at least in part on the first number of symbols; and transmit the uplink data during the uplink transmission opportunity using the transmission power.

The communications manager 515 as described herein may be implemented to realize one or more potential advantages. For example, using the same transmission power for repetitions of varying lengths may reduce reception complexity at the base station and allow combination of the repetitions, thereby increasing reliability and system efficiency. And using the same transmission power may reduce processing at the device 505, because the UE can perform one calculation for multiple repetitions rather than a calculation for each repetition. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
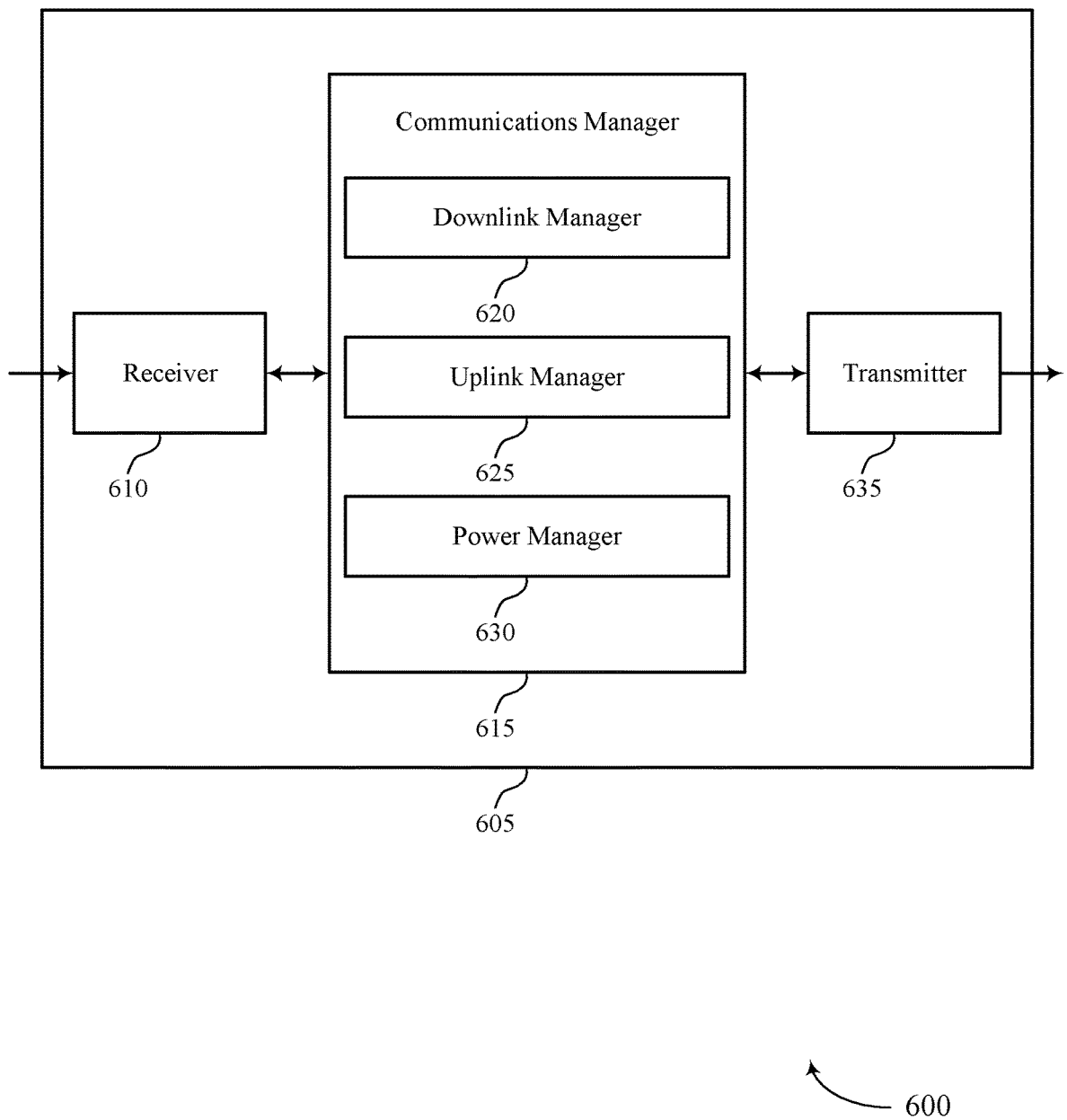

FIG. 6 shows a block diagram 600 of a device 605 that supports power control for repeated uplink transmissions in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to power control for repeated uplink transmissions, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a downlink manager 620, an uplink manager 625, and a power manager 630. The communications manager 615 may be an example of aspects of the communications manager 810 described herein.

The downlink manager 620 may receive an uplink grant that schedules a transmission of uplink data using a first number of symbols. The uplink manager 625 may identify, based at least in part on the uplink grant, an uplink transmission opportunity during which the uplink data is to be transmitted, where the uplink transmission opportunity includes a second number of symbols different from the first number of symbols. The power manager 630 may determine a transmission power for the uplink transmission opportunity based at least in part on the first number of symbols. The uplink manager 625 may transmit the uplink data during the uplink transmission opportunity using the transmission power.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
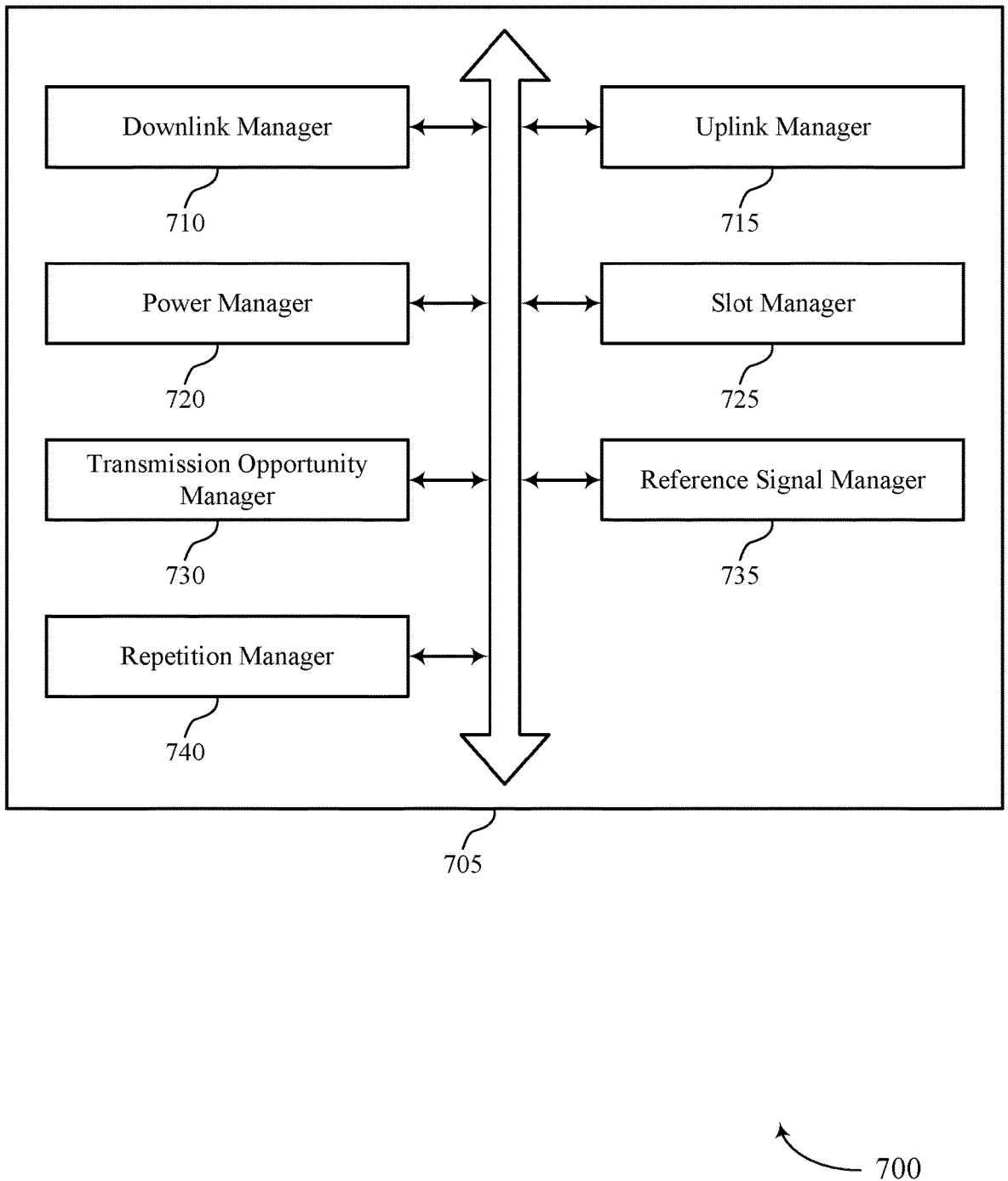
FIG. 7 shows a block diagram of a communications manager that supports power control for repeated uplink transmissions in accordance with aspects of the present disclosure.

FIG. 7 shows a block diagram 700 of a communications manager 705 that supports power control for repeated uplink transmissions in accordance with aspects of the present disclosure. The communications manager 705 may be an example of aspects of a communications manager 515, a communications manager 615, or a communications manager 810 described herein. The communications manager 705 may include a downlink manager 710, an uplink manager 715, a power manager 720, a slot manager 725, a transmission opportunity manager 730, a reference signal manager 735, and a repetition manager 740. Each of these modules may communicate, directly or indirectly, with one another (e.g., via one or more buses).

The downlink manager 710 may receive an uplink grant that schedules a transmission of uplink data using a first number of symbols. The uplink manager 715 may identify, based at least in part on the uplink grant, an uplink transmission opportunity during which the uplink data is to be transmitted, where the uplink transmission opportunity includes a second number of symbols different from the first number of symbols. The power manager 720 may determine a transmission power for the uplink transmission opportunity based at least in part on the first number of symbols. The uplink manager 715 may transmit the uplink data during the uplink transmission opportunity using the transmission power.

In some examples, the uplink grant schedules a PUSCH with a repetition type (e.g., Type B) that permits a nominal transmission of the PUSCH to include one or more actual transmissions of the PUSCH. In some examples, the first number of symbols is indicated by a SLIV included in the uplink grant.

In some examples, the uplink grant is included in a DCI message received, for example, via the PDCCH. In some examples, the uplink grant is included in an RRC message conveyed by RRC signaling.

In some cases, the second number of symbols is less than the first number of symbols, and the uplink transmission opportunity is for a portion of a scheduled repetition of the uplink data. Using a second uplink transmission opportunity that corresponds to a portion of a scheduled repetition may allow the UE to avoid transmitting the uplink data across a slot boundary (which could inhibit reception at the base station). Using a second uplink transmission opportunity that corresponds to a portion of a scheduled repetition may allow the UE to avoid transmitting the uplink data during a downlink transmission (which could reception at both the UE and the base station).

In some cases, the first number of symbols is a number of symbols in a nominal transmission of a PUSCH and the second number of symbols is a number of symbols in an actual transmission of the PUSCH. A nominal transmission of PUSCH may be a transmission whose length matches the length indicated by the uplink grant. An actual transmission may be a transmission whose length is different from the length indicated by the uplink grant.

In some examples, the power manager 720 may calculate the transmission power based on the first number of symbols. In some examples, the power manager 720 may determine a reference signal configuration based at least in part on the first number of symbols. In some examples, the power manager 720 may calculate the transmission power based on the reference signal configuration (e.g., a DMRS configuration or PTRS configuration). In some examples, the power manager 720 may determine, based at least in part on the reference signal configuration, a number of resource elements for a demodulation reference signal and a phase-tracking reference signal, where the transmission power is calculated based at least in part on the number of resource elements.

In some examples, the power manager 720 may determine a number of resource elements for transmitting the uplink data based at least in part on the first number of symbols. In some examples, the power manager 720 may calculate the transmission power based on the number of resource elements for transmitting the uplink data. In some examples, the power manager 720 may calculate the transmission power based on a BPRE associated with the transmission of uplink data, where the BPRE is a function of a number of resource elements scheduled for the transmission of uplink data. Calculating the transmission power based on the first number of symbols (e.g., based on the scheduled length L), the number of scheduled resource elements, or the scheduled BPRE may allow the UE to ensure that an adequate power is used, regardless of the length of the transmission opportunities.

In some cases (e.g., when the first number of symbols is different from the second number of symbols), the number of resource elements scheduled for the transmission of uplink data is different from a number of resource elements actually used for the transmission of uplink data.

The slot manager 725 may determine that the uplink data is scheduled across a slot boundary. The transmission opportunity manager 730 may identify, as a result of the uplink data being scheduled across the slot boundary, that the uplink transmission opportunity occurs before the slot boundary or after the slot boundary. The reference signal manager 735 may transmit a demodulation reference signal (DMRS) during the uplink transmission opportunity based at least in part on determining that the uplink transmission opportunity occurs before or after the slot boundary (e.g., as described with reference to communication scenario 300-*b*).

In some examples, the repetition manager 740 may determine that resources for transmitting the uplink data coincide with a downlink data transmission including a third number of symbols. In such cases, the uplink manager 715 may determine the second number of symbols based on the third number of symbols. For example, the uplink manager 715 may determine the second number of symbols to be the first number of symbols minus the third number of symbols (e.g., as described with reference to communication scenario 300-*c*). In some cases, the uplink grant includes a repetition factor (e.g., K) that indicates the uplink data is to be transmitted multiple times. In some examples, the uplink manager 715 may determine the first uplink transmission opportunity based on the repetition factor.

Figure 8:
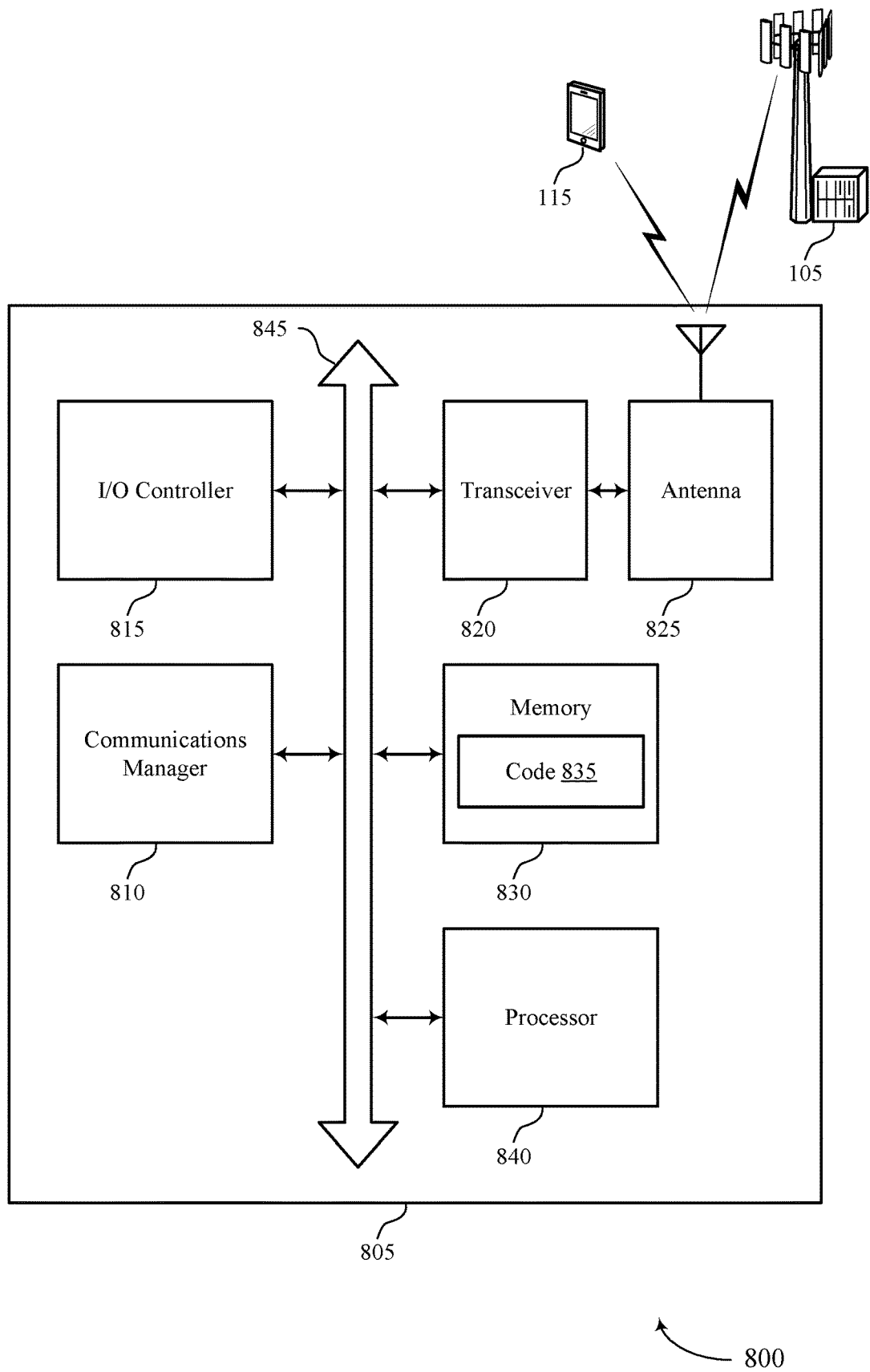
FIG. 8 shows a diagram of a system including a device that supports power control for repeated uplink transmissions in accordance with aspects of the present disclosure.

FIG. 8 shows a diagram of a system 800 including a device 805 that supports power control for repeated uplink transmissions in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive an uplink grant that schedules a transmission of uplink data using a first number of symbols; identify, based at least in part on the uplink grant, an uplink transmission opportunity during which the uplink data is to be transmitted, where the uplink transmission opportunity includes a second number of symbols different from the first number of symbols; determine a transmission power for the uplink transmission opportunity based at least in part on the first number of symbols; and transmit the uplink data during the uplink transmission opportunity using the transmission power.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting power control for repeated uplink transmissions).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
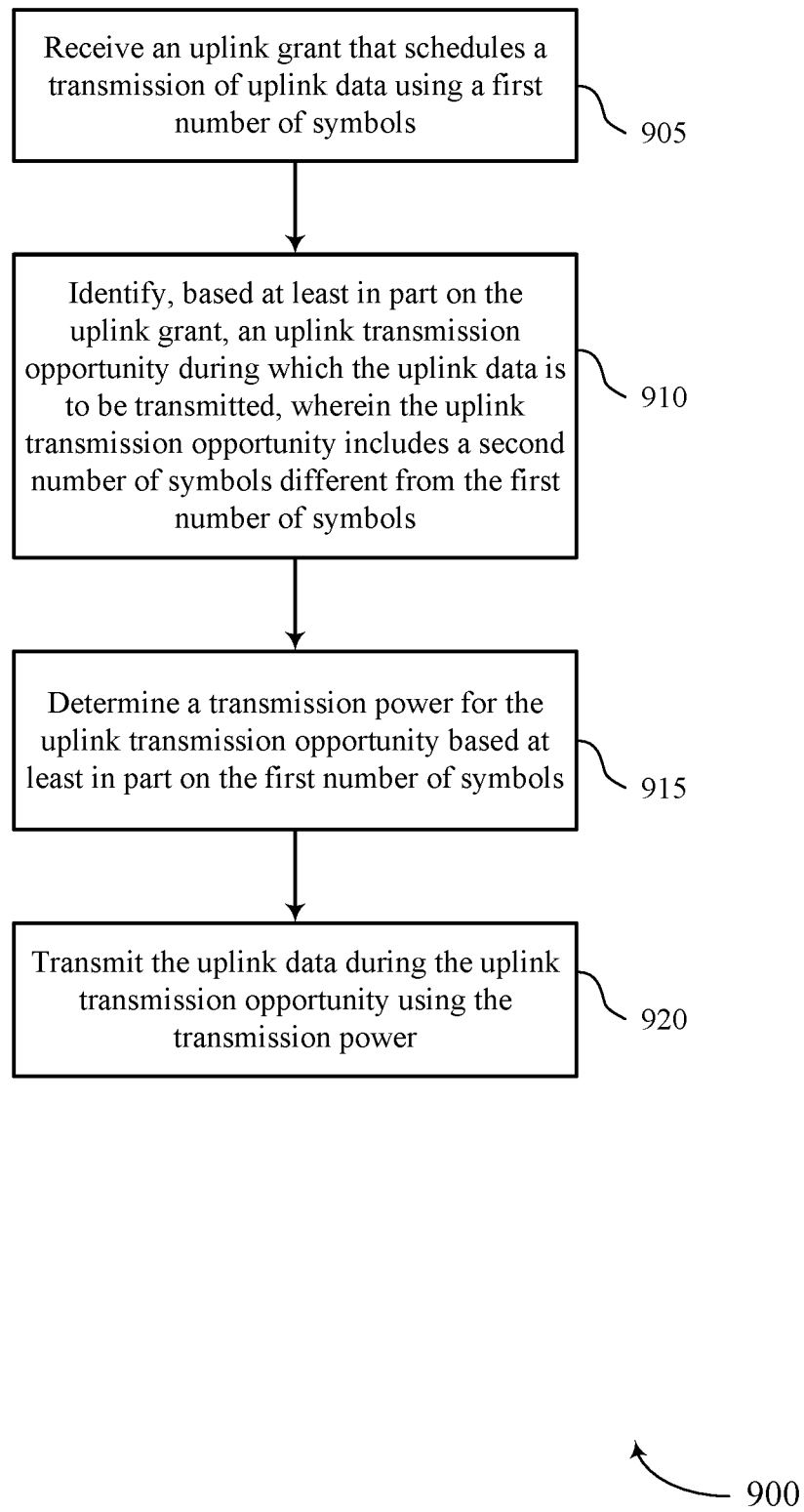
FIG. 9 shows a flowchart illustrating methods that support power control for repeated uplink transmissions in accordance with aspects of the present disclosure.

FIG. 9 shows a flowchart illustrating a method 900 that supports power control for repeated uplink transmissions in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may receive an uplink grant that schedules a transmission of uplink data using a first number of symbols. The uplink grant may be received via RRC or DCI (e.g., the uplink grant may be received in an RRC message or a DCI message). The operations of 905 may be performed according to the methods described herein. In some examples, aspects of the operations of 905 may be performed by a downlink manager as described with reference to FIGS. 5 through 8.

At 910, the UE may identify, based at least in part on the uplink grant, an uplink transmission opportunity during which the uplink data is to be transmitted, where the uplink transmission opportunity includes a second number of symbols different from the first number of symbols. In some examples, the second number of symbols is less than the first number of symbols. The operations of 910 may be performed according to the methods described herein. In some examples, aspects of the operations of 910 may be performed by an uplink manager as described with reference to FIGS. 5 through 8.

At 915, the UE may determine a transmission power for the uplink transmission opportunity based at least in part on the first number of symbols. The operations of 915 may be performed according to the methods described herein. In some examples, aspects of the operations of 915 may be performed by a power manager as described with reference to FIGS. 5 through 8.

At 920, the UE may transmit the uplink data during the uplink transmission opportunity using the transmission power. The operations of 920 may be performed according to the methods described herein. In some examples, aspects of the operations of 920 may be performed by an uplink manager as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Example 1: A method for wireless communication, comprising: receiving an uplink grant that schedules a transmission of uplink data using a first number of symbols; identifying, based at least in part on the uplink grant, an uplink transmission opportunity during which the uplink data is to be transmitted, wherein the uplink transmission opportunity includes a second number of symbols different from the first number of symbols; determining a transmission power for the uplink transmission opportunity based at least in part on the first number of symbols; and transmitting the uplink data during the uplink transmission opportunity using the transmission power.

Example 2: The method of example 1, wherein the first number of symbols is a number of symbols in a nominal transmission of PUSCH and the second number of symbols is a number of symbols in an actual transmission of the PUSCH.

Example 3: The method of any of examples 1 or 2, further comprising: determining a reference signal configuration based at least in part on the first number of symbols; and calculating the transmission power based at least in part on the reference signal configuration.

Example 4: The method of example 3, further comprising: determining, based at least in part on the reference signal configuration, a number of resource elements for a demodulation reference signal and a phase-tracking reference signal, wherein the transmission power is calculated based at least in part on the number of resource elements.

Example 5: The method of any of examples 1 to 4, further comprising: determining a number of resource elements for transmitting the uplink data based at least in part on the first number of symbols; and calculating the transmission power based at least in part on the number of resource elements for transmitting the uplink data.

Example 6: The method of any of examples 1 to 5, further comprising: calculating the transmission power based at least in part on a BPRE associated with the transmission of uplink data, wherein the BPRE is a function of a number of resource elements scheduled for the transmission of uplink data.

Example 7: The method of example 6, wherein the number of resource elements scheduled for the transmission of uplink data is different from a number of resource elements actually used for the transmission of uplink data.

Example 8: The method of any of examples 1 to 7, wherein the second number of symbols is less than the first number of symbols, and wherein the uplink transmission opportunity is for a portion of a scheduled repetition of the uplink data.

Example 9: The method of any of examples 1 to 8, further comprising: determining that the uplink data is scheduled across a slot boundary; identifying, as a result of the uplink data being scheduled across the slot boundary, that the uplink transmission opportunity occurs before the slot boundary or after the slot boundary; and transmitting a DMRS during the uplink transmission opportunity based at least in part on determining that the uplink transmission opportunity occurs before or after the slot boundary.

Example 10: The method of any of examples 1 to 8, further comprising: determining that resources for transmitting the uplink data coincide with a downlink data transmission comprising a third number of symbols, wherein the second number of symbols comprises the first number of symbols minus the third number of symbols.

Example 11: The method of any of examples 1 to 10, wherein the uplink grant includes a repetition factor that indicates the uplink data is to be transmitted multiple times, and wherein the uplink transmission opportunity is determined based at least in part on the repetition factor.

Example 12: The method of any of examples 1 to 11, wherein the uplink grant is included in a DCI message.

Example 13: The method of any of examples 1 to 12, wherein the uplink grant schedules a PUSCH with a repetition type that permits a nominal transmission of the PUSCH to include one or more actual transmissions of the PUSCH.

Example 14: The method of any of examples 1 to 13, wherein the first number of symbols is indicated by a SLIV included in the uplink grant.

Example 15: An apparatus for wireless communications comprising a processor; memory coupled with the processor; and instructions stored in the memory and executable by the processor to cause the apparatus to perform a method of any of examples 1 to 14.

Example 16: An apparatus comprising at least one means for performing a method of any of examples 1 to 14.

Example 17: A non-transitory computer-readable medium storing code for wireless communications, the code comprising instructions executable by a processor to perform a method of any of examples 1 to 14.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication, comprising:
    receiving an uplink grant that indicates a first quantity of symbols in a nominal transmission of a physical uplink shared channel (PUSCH) for a transmission of uplink data that is associated with a repetition type;
    determining a transmission power for an uplink transmission opportunity, including a second quantity of symbols in an actual transmission of the PUSCH, based at least in part on the first quantity of symbols being indicated by the uplink grant for the transmission associated with the repetition type, wherein the second quantity of symbols in the actual transmission is different from the first quantity of symbols in the nominal transmission; and transmitting the uplink data during the uplink transmission opportunity including the second quantity of symbols in the actual transmission using the transmission power that is based at least in part on the first quantity of symbols in the nominal transmission.

2. The method of claim 1, wherein the uplink grant schedules the PUSCH with the repetition type, and wherein the repetition type comprises repetition Type B that permits the nominal transmission of the PUSCH to include one or more actual transmissions of the PUSCH.

3. The method of claim 1, wherein the first quantity of symbols is indicated by a starting and length indicator (SLIV) included in the uplink grant.

4. The method of claim 1, further comprising:
determining a reference signal configuration based at least in part on the first quantity of symbols, wherein determining the transmission power comprises:
calculating the transmission power based at least in part on the reference signal configuration.

5. The method of claim 4, further comprising:
determining, based at least in part on the reference signal configuration, a quantity of resource elements for a demodulation reference signal and a phase-tracking reference signal, wherein the transmission power is calculated based at least in part on the quantity of resource elements.

6. The method of claim 1, further comprising:
determining a quantity of resource elements for transmitting the uplink data based at least in part on the first quantity of symbols, wherein determining the transmission power comprises:
calculating the transmission power based at least in part on the quantity of resource elements for transmitting the uplink data.

7. The method of claim 1, wherein determining the transmission power comprises:
calculating the transmission power based at least in part on a bit per resource element (BPRE) associated with the transmission of uplink data, wherein the BPRE is a function of a quantity of resource elements scheduled for the transmission of uplink data.

8. The method of claim 7, wherein the quantity of resource elements scheduled for the transmission of uplink data is different from a quantity of resource elements actually used for the transmission of uplink data.

9. The method of claim 1, wherein the second quantity of symbols is less than the first quantity of symbols, and wherein the uplink transmission opportunity is for a portion of a scheduled repetition of the uplink data.

10. The method of claim 1, wherein the uplink grant includes a repetition factor that indicates the uplink data is to be transmitted multiple times, and wherein the uplink transmission opportunity is determined based at least in part on the repetition factor.

11. The method of claim 1, wherein the uplink grant is included in a downlink control information (DCI) message or a radio resource control (RRC) message.

12. An apparatus for wireless communication, comprising:
a processor,
memory coupled with the processor; and
instructions stored in the memory and executable by the processor to cause the apparatus to:

receive an uplink grant that indicates a first quantity of symbols in a nominal transmission of a physical uplink shared channel (PUSCH) for a transmission of uplink data that is associated with a repetition type;

determine a transmission power for an uplink transmission opportunity, including a second quantity of symbols in an actual transmission of the PUSCH, based at least in part on the first quantity of symbols being indicated by the uplink grant for the transmission associated with the repetition type, wherein the second quantity of symbols in the actual transmission is different from the first quantity of symbols in the nominal transmission; and transmit the uplink data during the uplink transmission opportunity including the second quantity of symbols in the actual transmission using the transmission power that is based at least in part on the first quantity of symbols in the nominal transmission.

13. The apparatus of claim 12, wherein the uplink grant schedules the PUSCH with the repetition type, and wherein the repetition type comprises repetition type B that permits the nominal transmission of the PUSCH to include one or more actual transmissions of the PUSCH.

14. The apparatus of claim 12, wherein the first quantity of symbols is indicated by a starting and length indicator (SLIV) included in the uplink grant.

15. The apparatus of claim 12, wherein the instructions executable to by the processor to cause the apparatus to:
determine a reference signal configuration based at least in part on the first quantity of symbols; and
calculate the transmission power based at least in part on the reference signal configuration.

16. The apparatus of claim 15, wherein the instructions executable to by the processor to cause the apparatus to:
determine, based at least in part on the reference signal configuration, a quantity of resource elements for a demodulation reference signal and a phase-tracking reference signal, wherein the transmission power is calculated based at least in part on the quantity of resource elements.

17. The apparatus of claim 12, wherein the instructions executable to by the processor to cause the apparatus to:
determine a quantity of resource elements for transmitting the uplink data based at least in part on the first quantity of symbols; and
calculate the transmission power based at least in part on the quantity of resource elements for transmitting the uplink data.

18. The apparatus of claim 12, wherein the instructions executable to by the processor to cause the apparatus to determine the transmission power are executable by the processor to cause the apparatus to:
calculate the transmission power based at least in part on a bit per resource element (BPRE) associated with the transmission of uplink data, wherein the BPRE is a function of a quantity of resource elements scheduled for the transmission of uplink data.

19. The apparatus of claim 18, wherein the quantity of resource elements scheduled for the transmission of uplink data is different from a quantity of resource elements actually used for the transmission of uplink data.

20. The apparatus of claim 12, wherein the second quantity of symbols is less than the first quantity of symbols, and wherein the uplink transmission opportunity is for a portion of a scheduled repetition of the uplink data.

21. An apparatus for wireless communication, comprising:
- means for receiving an uplink grant that indicates a first quantity of symbols in a nominal transmission of a physical uplink shared channel (PUSCH) for a transmission of uplink data that is associated with a repetition type;
- means for determining a transmission power for an uplink transmission opportunity, including a second quantity of symbols in an actual transmission of the PUSCH, based at least in part on the first quantity of symbols being indicated by the uplink grant for the transmission associated with the repetition type, wherein the second quantity of symbols in the actual transmission is different from the first quantity of symbols in the nominal transmission; and
- means for transmitting the uplink data during the uplink transmission opportunity including the second quantity of symbols in the actual transmission using the transmission power that is based at least in part on the first quantity of symbols in the nominal transmission.

22. The apparatus of claim 21, wherein the uplink grant schedules the PUSCH with the repetition type, and wherein the repetition type comprises repetition type B that permits the nominal transmission of the PUSCH to include one or more actual transmissions of the PUSCH.

23. The apparatus of claim 21, wherein the first quantity of symbols is indicated by a starting and length indicator (SLIV) included in the uplink grant.

24. The apparatus of claim 21, further comprising:
- means for determining a reference signal configuration based at least in part on the first quantity of symbols; and
- means for calculating the transmission power based at least in part on the reference signal configuration.

25. The apparatus of claim 24, further comprising:
- means for determining, based at least in part on the reference signal configuration, a quantity of resource elements for a demodulation reference signal and a phase-tracking reference signal, wherein the transmission power is calculated based at least in part on the quantity of resource elements.

26. The apparatus of claim 21, further comprising:
- determining a quantity of resource elements for transmitting the uplink data based at least in part on the first quantity of symbols; and
- means for calculating the transmission power based at least in part on the quantity of resource elements for transmitting the uplink data.

27. A non-transitory computer-readable medium storing code for wireless communication, the code comprising instructions executable by a processor to:
- receive an uplink grant that indicates a first quantity of symbols in a nominal transmission of a physical uplink shared channel (PUSCH) for a transmission of uplink data that is associated with a repetition type;
- determine a transmission power for an uplink transmission opportunity, including a second quantity of symbols in an actual transmission of the PUSCH, based at least in part on the first quantity of symbols being indicated by the uplink grant for the transmission associated with the repetition type, wherein the second quantity of symbols in the actual transmission is different from the first quantity of symbols in the nominal transmission; and
- transmit the uplink data during the uplink transmission opportunity including the second quantity of symbols in the actual transmission using the transmission power that is based at least in part on the first quantity of symbols in the nominal transmission.

* * * * *